United States Patent
Okazaki et al.

(10) Patent No.: US 12,552,723 B2
(45) Date of Patent: Feb. 17, 2026

(54) CERAMIC HONEYCOMB STRUCTURE AND ITS PRODUCTION METHOD

(71) Applicant: PROTERIAL, LTD., Tokyo (JP)

(72) Inventors: Shunji Okazaki, Fukuoka (JP); Kenichiro Shimizu, Fukuoka (JP); Toshitaka Ishizawa, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 173 days.

(21) Appl. No.: 18/686,983

(22) PCT Filed: Sep. 21, 2022

(86) PCT No.: PCT/JP2022/035221
§ 371 (c)(1),
(2) Date: Feb. 27, 2024

(87) PCT Pub. No.: WO2023/048194
PCT Pub. Date: Mar. 30, 2023

(65) Prior Publication Data
US 2024/0368042 A1    Nov. 7, 2024

(30) Foreign Application Priority Data
Sep. 27, 2021   (JP) ................................ 2021-156546

(51) Int. Cl.
*C04B 38/00* (2006.01)
*B01D 39/20* (2006.01)
(Continued)

(52) U.S. Cl.
CPC ...... *C04B 38/0019* (2013.01); *B01D 39/2068* (2013.01); *B01D 46/0001* (2013.01);
(Continued)

(58) Field of Classification Search
None
See application file for complete search history.

(56) References Cited

U.S. PATENT DOCUMENTS

| 4,595,662 A | 6/1986 | Mochida et al. |
| 5,914,187 A | 6/1999 | Naruse et al. |

(Continued)

FOREIGN PATENT DOCUMENTS

| JP | 60-141667 A | 7/1985 |
| JP | 61-26572 A | 2/1986 |

(Continued)

OTHER PUBLICATIONS

Japanese Office Action for JP2023-514699 mailed Apr. 4, 2023.
International Search Report for PCT/JP2022/035221 dated Nov. 22, 2022.

*Primary Examiner* — Elizabeth Collister
(74) *Attorney, Agent, or Firm* — Sughrue Mion, PLLC (57) ABSTRACT

A ceramic honeycomb structure comprising pluralities of honeycomb segments each having pluralities of longitudinally penetrating flow paths partitioned by porous cell walls and plugs formed in the end portions of the flow paths, and a bonding material layer boding the peripheral walls of the honeycomb segments, the bonding material layer comprising silicon carbide particles as aggregate and a bonding phase bonding the silicon carbide particles, the bonding phase comprising at least a cordierite phase and a spinel phase, the molar ratio M1 of the cordierite phase [=cordierite phase/(cordierite phase+spinel phase)] being 0.50 or more and less than 1.0, and the content of (cordierite phase+spinel phase) in the bonding phase being 50% or more by mass.

12 Claims, 4 Drawing Sheets

(51) Int. Cl.
*B01D 46/00* (2022.01)
*B01D 46/24* (2006.01)

(52) U.S. Cl.
CPC ..... *B01D 46/2448* (2013.01); *B01D 46/2455* (2013.01); *B01D 46/2478* (2021.08); *B01D 2239/10* (2013.01); *B01D 2279/30* (2013.01); *C04B 2235/94* (2013.01); *C04B 2235/9607* (2013.01)

(56) References Cited

U.S. PATENT DOCUMENTS

| | | |
|---|---|---|
| 2008/0187712 A1 | 8/2008 | Ichikawa et al. |
| 2013/0316130 A1 | 11/2013 | Takahashi et al. |
| 2015/0275725 A1 | 10/2015 | Ichikawa et al. |

FOREIGN PATENT DOCUMENTS

| | | |
|---|---|---|
| JP | 8-28246 A | 1/1996 |
| JP | 2015-187044 A | 10/2015 |
| WO | 2006/098191 A1 | 9/2006 |
| WO | 2013/125713 A1 | 8/2013 |

CERAMIC HONEYCOMB STRUCTURE AND ITS PRODUCTION METHOD

CROSS REFERENCE TO RELATED APPLICATIONS

This application is a National Stage of International Application No. PCT/JP2022/035221 filed Sep. 21, 2022, claiming priority based on Japanese Patent Application No. 2021-156546 filed Sep. 27, 2021.

FIELD OF THE INVENTION

The present invention relates to a ceramic honeycomb structure used in a ceramic honeycomb filter for cleaning an exhaust gas discharged from internal engines such as diesel engines by removing particulate matter, which may be called "PM", and so on from the exhaust gas, and its production method.

BACKGROUND OF THE INVENTION

Figure 3A:
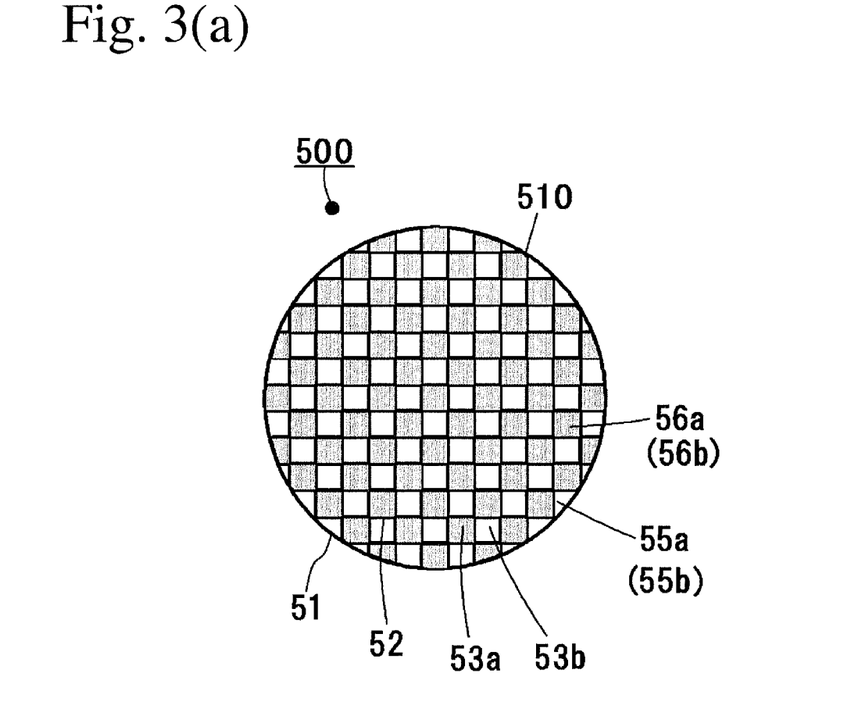
FIG. 3(a) is a front view schematically showing an example of ceramic honeycomb filters.
Figure 3B:
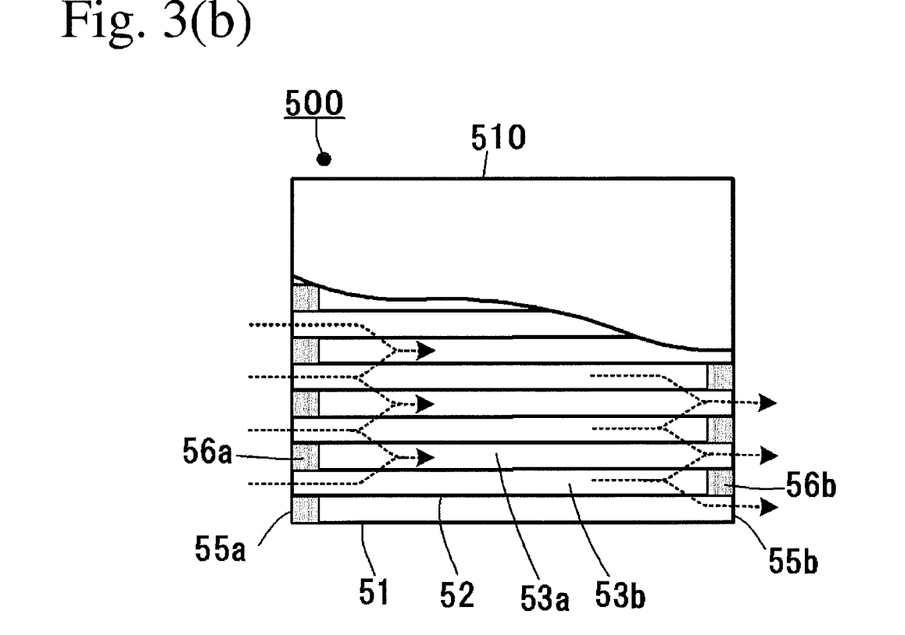
FIG. 3(b) is a partial cross-sectional view longitudinally showing the ceramic honeycomb filter of FIG. 3(a).

Because exhaust gases discharged from diesel engines contain NOx and PM, which are likely to adversely affect humans and environment when discharged into the air, a ceramic honeycomb structure carrying a NOx catalyst and a ceramic honeycomb filter for capturing PM have conventionally been attached as exhaust-gas-cleaning apparatuses to the exhaust pipes of diesel engines. An example of ceramic honeycomb filters for cleaning an exhaust gas by capturing PM in the exhaust gas is shown in FIGS. 3(a) and 3(b). The ceramic honeycomb filter 500 comprises a ceramic honeycomb structure 510 comprising porous cell walls 52 defining pluralities of flow paths 53a, 53b and a peripheral wall 51, and exhaust-gas-inlet-side plugs 56a and outlet-side plugs 56b for sealing exhaust-gas-inlet-side end surfaces 55a of inlet-side-plugged flow paths 53a and outlet-side end surfaces 55b of outlet-side-plugged flow paths 53b alternately in a checkerboard pattern. As shown by dotted arrows in FIG. 3(b), the exhaust gas flows into the outlet-side-plugged flow paths 53b open on the exhaust-gas-inlet-side end surface 55a, passes through communicating pores on and in the cell walls 52, and flows out from the inlet-side-plugged flow paths 53a open on the outlet-side end surface 55b. While the exhaust gas passes through the communicating pores on and in the cell walls 52, PM in the exhaust gas is captured, thereby cleaning the exhaust gas. When the amount of captured PM reaches a predetermined level, the captured PM is burned off to regenerate the ceramic honeycomb filter. It is known that because such ceramic honeycomb structures are used in an increasingly severer environment, they are made of refractory particles such as silicon carbide (SiC) particles having excellent heat shock resistance.

Figure 1:
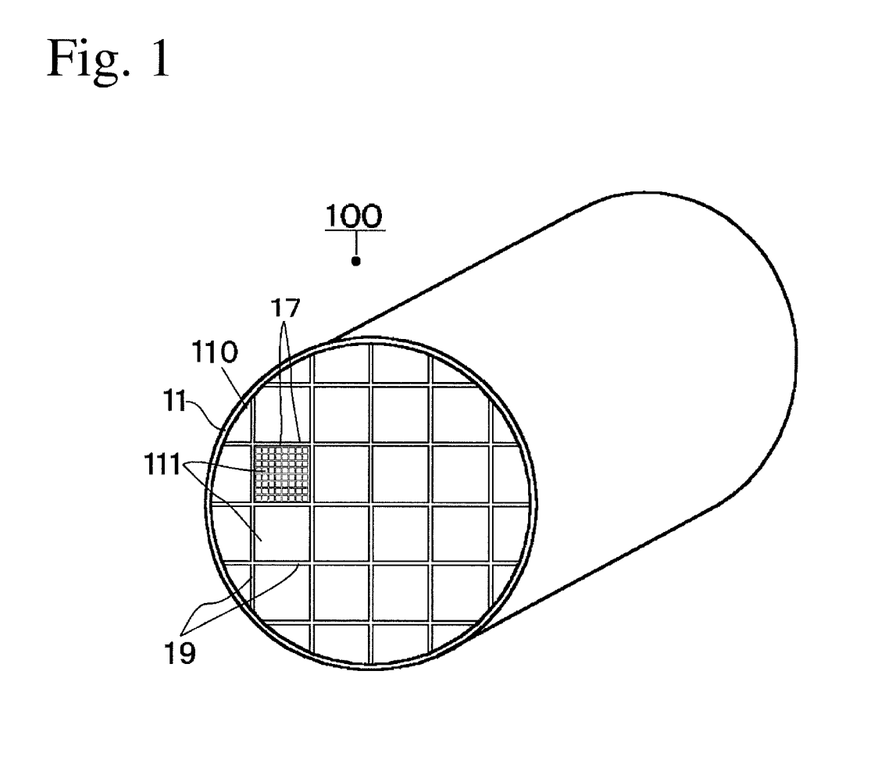
FIG. 1 is a perspective view schematically showing an example of ceramic honeycomb filters according to the present invention.

The above ceramic honeycomb structure may be subjected to thermal stress by an uneven temperature distribution occurring by uneven heating during regeneration, local heat generation by the irregular combustion of PM, heat shock by the rapid temperature change of an exhaust gas, etc., resulting in failure such as cracking, breakage, etc., and melting. To cope with such problems, as shown in FIG. 1, a proposal was made to provide a ceramic honeycomb filter 100 comprising a segment-bonded ceramic honeycomb structure 110 constituted by integrally bonding pluralities of honeycomb segments 111 with bonding material layers 19 to alleviate the thermal stress.

For example, JP 8-28246 A discloses a ceramic honeycomb structure having pluralities of longitudinally aligned flow paths, end surfaces of these flow paths being sealed in a checkerboard pattern such that the flow paths are open oppositely on the inlet and outlet sides, the ceramic honeycomb structure being constituted by bonding pluralities of honeycomb segment members such that adjacent flow paths are communicating with each other through porous cell walls, the honeycomb segment members being integrally bonded via a bonding material layer comprising at least inorganic fibers, an inorganic binder, an organic binder and inorganic particles, which is filled between the honeycomb segment members, dried and cured.

WO 2006/098191 discloses a ceramic honeycomb structure having excellent heat shock resistance and surely preventing failure such as cracking, etc. during the regeneration of a filter, an outer portion of a bonding material layer for bonding pluralities of honeycomb segments, which exists within a distance corresponding to 20% of the thickness of the bonding material layer from a contact surface of the honeycomb segment, having smaller porosity than that of a center portion of the bonding material layer located inside the outer portion. WO 2006/098191 A describes that the bonding material layer is formed by blending a bonding material comprising inorganic fibers (for example, aluminosilicate fibers), an inorganic binder (for example, colloidal silica, clay), inorganic particles (for example, silicon carbide), and water.

WO 2013/125713 discloses a ceramic honeycomb structure exhibiting further improved heat shock resistance even under increased thermal stress during regeneration, which occur in larger filters, the ceramic honeycomb structure comprising pluralities of honeycomb segments each having porous cell walls defining fluid flow paths extending from one end surface to the other end surface, a peripheral wall formed on the outermost surface for surrounding the cell walls, and plugs formed in the end portions of the flow paths on one and other sides, and a bonding material layer having pluralities of pores and bonding adjacent honeycomb segments with their side surfaces opposing each other, 60% or more of all pores in the bonding material layer having a maximum diameter/minimum diameter ratio of 1.2 or less. WO 2013/125713 describes that the bonding material layer is formed by a bonding material, which is obtained by mixing and blending 65 parts by mass of silicon carbide as aggregate, 5 parts by mass of a foamed resin as a pore-forming material, 20 parts by mass of colloidal silica, 0.5 parts by mass of carboxymethyl cellulose, 5 parts by mass of aluminosilicate fibers, 0.1 parts by mass of a dispersant, and water.

Recently, the improvement of heat shock resistance is strongly desired in ceramic honeycomb structures, but in the ceramic honeycomb structures described in JP 8-28246 A, WO 2006/098191 and WO 2013/125713, in which honeycomb segments are integrally bonded via bonding material layers, the bonding material layers may have insufficient strength, when local thermal stress is generated during use for filters or during regeneration. Thus, further improvement in the bonding strength of the bonding material layers is desired.

OBJECT OF THE INVENTION

Accordingly, an object of the present invention is to provide a ceramic honeycomb structure comprising honeycomb segment members integrally bonded via a bonding material layer, which has excellent strength, and exhibits a thermal-stress-relaxing function on the same level as or higher than that of conventional ceramic honeycomb structures even when the ceramic honeycomb structure is subjected to thermal stress by uneven heating during regeneration, local heat generation by the irregular combustion of PM, heat shock due to the rapid temperature change of an exhaust gas, etc., and its production method.

SUMMARY OF THE INVENTION

As a result of intensive research in view of the above object, the inventors have focused attention on bonding materials in a bonding material layer bonding honeycomb segment members, finding that when the bonding material layer comprises silicon carbide particles as aggregate and a bonding phase bonding silicon carbide particles, and when the bonding phase comprises at least a cordierite phase and a spinel phase at a particular molar ratio, the bonding material layer exhibits excellent thermal-stress-relaxing function and strength. The present invention has been completed based on such finding.

Thus, the ceramic honeycomb structure of the present invention comprises pluralities of honeycomb segments each having pluralities of longitudinally penetrating flow paths partitioned by porous cell walls and plugs formed in the end portions of the flow paths, and a bonding material layer boding the peripheral walls of the honeycomb segments, the bonding material layer comprising silicon carbide particles as aggregate and a bonding phase bonding the silicon carbide particles, the bonding phase comprising at least a cordierite phase and a spinel phase, the molar ratio M1 of the cordierite phase [=cordierite phase/(cordierite phase+spinel phase)] being 0.50 or more and less than 1.0, and the content of (cordierite phase+spinel phase) in the bonding phase being 50% or more by mass.

The bonding phase may further contain at least one selected from the group consisting of cristobalite, mullite and forsterite.

The thermal conductivity of the bonding material layer is preferably 0.1-4.0 W/m·K.

The porosity of the bonding material layer is preferably 50-70%.

The method of the present invention for producing a ceramic honeycomb structure comprises mixing 100 parts by mass of silicon carbide particles with a binder comprising 5-25 parts by mass in total of alumina source particles and magnesia source particles, and an organic binder, blending the resultant mixture with water to obtain a slurry, applying the slurry to the peripheral walls of the honeycomb segments, bonding the peripheral walls of the honeycomb segments to each other, drying the bonded honeycomb segments, and sintering the bonded honeycomb segments in a range of 1100-1350° C. in the air.

The binder preferably further contains an inorganic binder.

The inorganic binder is preferably colloidal silica and/or colloidal alumina.

The binder may further contain a pore-forming material.

The binder may further contain at least one selected from the group consisting of spinel particles, mullite particles and forsterite particles.

The alumina source particles and the magnesia source particles are preferably mixed at a molar ratio M2 [=(Al$_2$O$_3$)/(Al$_2$O$_3$+MgO)] of 0.30-0.60.

In the binder, the alumina source particles are preferably alumina particles or aluminum hydroxide particles, and the magnesia source particles are preferably magnesium oxide particles or magnesium hydroxide particles.

The silicon carbide particles preferably has a ratio D90/D10 of 1 or more and less than 10, wherein D10 represents a particle diameter at a cumulative particle volume corresponding to 10% of the total particle volume, and D90 represents a particle diameter at a cumulative particle volume corresponding to 90% of the total particle volume, in a curve showing the relation between particle diameter and cumulative particle volume.

EFFECTS OF THE INVENTION

The present invention provides a ceramic honeycomb structure comprising honeycomb segment members integrally bonded via a bonding material layer, which has excellent strength, and exhibits a thermal-stress-relaxing function on the same level as or higher than that of conventional ceramic honeycomb structures even when the ceramic honeycomb structure is subjected to thermal stress by uneven heating during regeneration, local heat generation due to the irregular combustion of PM, heat shock by the rapid temperature change of an exhaust gas, etc., and its production method.

DESCRIPTION OF THE PREFERRED EMBODIMENTS

The embodiments of the present invention will be explained blow referring to the figures. The present invention is not restricted to the embodiments below but may be modified or improved within the scope of the invention.

[1] Ceramic Honeycomb Structure

Figure 2A:
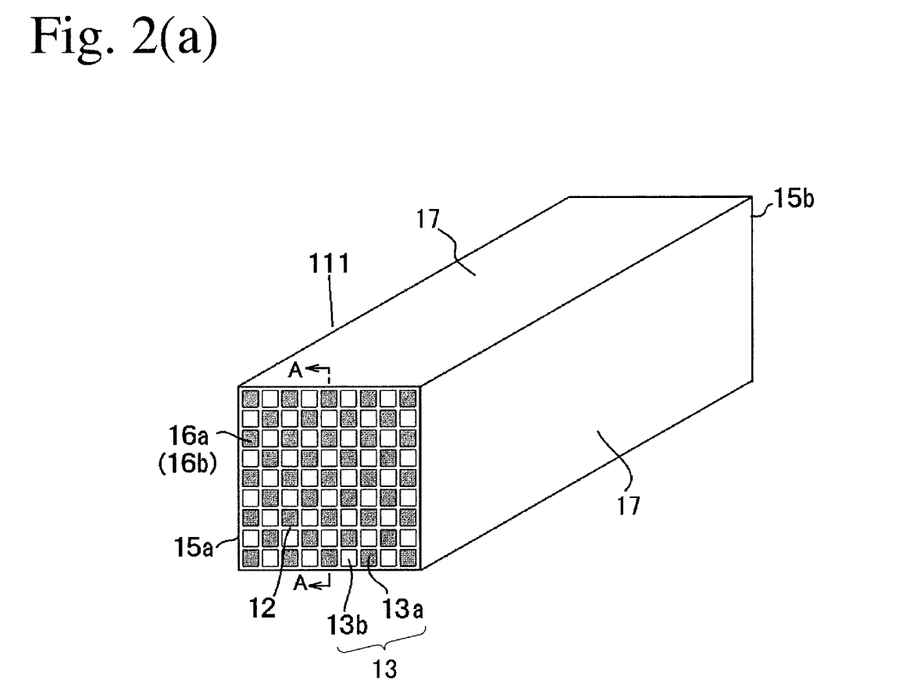
FIG. 2(a) is a perspective view schematically showing a ceramic honeycomb segment.
Figure 2B:
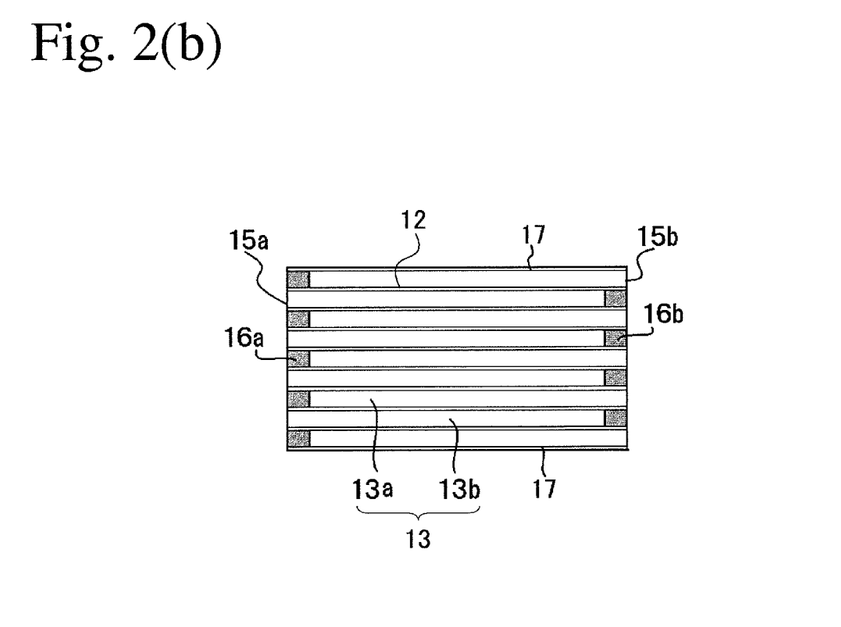
FIG. 2(b) is a cross-sectional view taken along the line A-A in FIG. 2(a).

An example of ceramic honeycomb structures according to an embodiment of the present invention is shown in FIGS. 1, 2(a) and 2(b). The ceramic honeycomb structure 110 comprises pluralities of honeycomb segments 111 each having pluralities of longitudinally penetrating flow paths 13 partitioned by porous cell walls 12 and plugs 16a, 16b formed in the end portions of the flow paths 13, and a bonding material layer 19 bonding the peripheral walls 17 of the honeycomb segments 111; the bonding material layer 19 comprising silicon carbide particles as aggregate, and a bonding phase bonding the silicon carbide particles; the bonding phase comprising at least a cordierite phase and a spinel phase; the molar ratio M1 of the cordierite phase [=cordierite phase/(cordierite phase+spinel phase)] being 0.50 or more and less than 1.0; and the content of (cordierite phase+spinel phase) in the bonding layer being 50% or more by mass.

[1-1] Honeycomb Segment

As shown in FIGS. 2(a) and 2(b), the honeycomb segment 111 comprises pluralities of longitudinally penetrating flow paths 13 partitioned by porous cell walls 12, a peripheral wall 17 formed on the outermost surface, and plugs 16a, 16b formed in the end portions of the flow paths 13. The plugs 16a, 16b are formed in exhaust-gas-inlet-side end portions 15a of inlet-side-plugged flow paths 13a and exhaust-gas-outlet-side end portions 15b of outlet-side-plugged flow paths 13b adjacent to the inlet-side-plugged flow paths 13a alternately in a checkerboard pattern. Incidentally, the plugs 16a, 16b may be formed in inner portions of the flow paths than the inlet-side or outlet-side end portions 15a, 15b.

The cross section of each flow path 13 in the honeycomb segment 111 in perpendicular to the longitudinal direction is not restricted to a square shape as shown in FIG. 2(a), but may have a polygonal shape such as triangle, hexagon, octagon, etc. Also, the cross section shapes of the flow paths 13 may be unsymmetrical. For example, both inlet-side-plugged flow paths 13a and outlet-side-plugged flow paths 13b may have square shapes different in size, or they may be a combination of square and hexagonal shapes or a combination of square and octagonal shapes, or a combination of octagonal shapes different in size. Further, the axial cross section shape of one honeycomb segment 111 is not restricted to square, but may be triangle, hexagon, etc.

To achieve excellent heat shock resistance, a material for the honeycomb segment 111 may be a composite silicon-silicon carbide comprising silicon carbide (SiC) as aggregate and silicon as a binder, a composite silicon carbide oxide comprising silicon carbide as aggregate and an oxide as a binder, etc.

[1-2] Bonding Material Layer

As shown in FIG. 1, the bonding material layer 19 bonds pluralities of honeycomb segments 111 positioned such that the peripheral walls 17 of adjacent honeycomb segments 111 are facing each other. The bonding material layer 19 comprises silicon carbide particles as aggregate, and a bonding phase bonding silicon carbide particles. The bonding phase comprises at least a cordierite phase and a spinel phase, the molar ratio M1 of the cordierite phase [=cordierite phase/(cordierite phase+spinel phase)] being 0.50 or more and less than 1.0, and the content of (cordierite phase+spinel phase) in the bonding phase being 50% or more by mass.

Because the bonding phase comprises at least a cordierite phase and a spinel phase in an amount of 50% or more by mass, and because the molar ratio M1 of the cordierite phase [=cordierite phase/(cordierite phase+spinel phase)] is 0.50 or more and less than 1.0, good thermal conductivity is achieved between silicon carbide particles as aggregate, resulting in excellent heat conduction between the bonded honeycomb segments. As a result, the temperature difference between the bonded honeycomb segments disappears rapidly, alleviating stress concentration. Further, because the bonding phase bonding silicon carbide particles as aggregate has sufficient strength, the bonding material layer exhibits sufficiently high strength.

The content of (cordierite phase+spinel phase) in the bonding phase means a total mass ratio of the cordierite phase and the spinel phase per a total mass ratio of crystal phases in the bonding phase, which is expressed by (mass ratio of cordierite phase+mass ratio of spinel phase)/total mass ratio of crystal phases. The content of (cordierite phase+spinel phase) in the bonding phase is preferably 55% or more by mass, more preferably 60% or more by mass, and most preferably 70% or more by mass. The bonding phase may contain cristobalite, mullite, forsterite, etc., in addition to the cordierite phase and the spinel phase. The bonding phase may contain other crystal and non-crystal phases at a total percentage of less than 50% by mass, preferably less than 40% by mass, further preferably less than 30% by mass.

The molar ratio M1 of the cordierite phase is a ratio calculated from the molar number of the cordierite phase and the molar number of the spinel phase by the formula of "cordierite phase (mol)/[cordierite phase (mol)+spinel phase (mol)]". When the molar ratio M1 of the cordierite phase is less than 0.50, the bonding phase has poor heat conduction, resulting in less alleviation of stress concentration, and lower strength. On the other hand, to keep good heat resistance, the upper limit of the molar ratio M1 of the cordierite phase is preferably 0.95 or less, further preferably 0.90 or less, more preferably 0.85 or less, and most preferably 0.80 or less.

The molar ratio M1 of the cordierite phase [=cordierite phase/(cordierite phase+spinel phase)] and the content of (cordierite phase+spinel phase) in the bonding phase can be obtained as follows. First, a portion of the bonding material layer bonded to the peripheral wall of the honeycomb segment is subjected to powder X-ray diffraction measurement to obtain a powder diffraction chart, from which the peak strengths of crystal phases (a (110) plane of the cordierite phase, a (311) plane of the spinel phase, a (101) plane of the cristobalite phase, a (110) plane of the mullite phase, and a (130) plane of the forsterite phase) are determined. Each peak strength is converted to the mass of each crystal phase, to determine the mass ratio of each crystal phase. The mass ratios of the crystal phases are summed to obtain the total mass ratio of the crystal phases. The total mass ratio of the cordierite phase and the spinel phase per the total mass ratio of the crystal phases is regarded as the content of (cordierite phase+spinel phase) in the bonding phase. Further, assuming that 1 mol of cordierite has a mass of 585.0 and 1 mol of spinel has a mass of 142.3, the mass ratios of the cordierite phase and the spinel phase are converted to the molar numbers of cordierite and spinel, to determine the molar ratio M1 of the cordierite phase to the sum of the cordierite phase and the spinel phase.

The thermal conductivity of the bonding material layer 19 is preferably 0.1-4.0 W/m·K, because good heat conduction is achieved between the bonded honeycomb segments 111, resulting in the rapid alleviation of stress concentration. The thermal conductivity of less than 0.1 W/m·K provides poor heat conduction, resulting in less alleviation of stress concentration. On the other hand, the thermal conductivity of more than 4.0 W/m·K may result in lower heat resistance. The thermal conductivity is preferably 0.2 W/m·K in lower limit and 3.5 W/m·K in upper limit. The upper limit is more preferably 3.0 W/m·K, further preferably 2.5 W/m·K, and most preferably 2.0 W/m·K.

When the porosity of the bonding material layer 19 is 50-70%, the bonding material layer 19 has sufficiently high thermal conductivity, resulting in good heat conduction between the bonded honeycomb segments, alleviating the stress concentration, and also exhibits sufficiently high strength. When the porosity is less than 50%, the bonding material shrinks by drying, generating gaps in the bonding material layer 19 and in boundaries between the bonding material layer 19 and the honeycomb segments 111, lowering the strength of the bonding material layer 19. On the other hand, the porosity of more than 70% results in lower heat conduction, so that locally generated thermal stress tends to remain in the segments, resulting in less alleviation of thermal stress concentration, and more damage. The porosity is preferably 55% in lower limit and 65% in upper limit.

[1-3] Ceramic Honeycomb Filter

For example, as shown in FIG. 1, the ceramic honeycomb filter 100 is obtained by integrally bonding pluralities of honeycomb segments 111 shown in FIGS. 2(a) and 2(b) by the bonding material layer 19, machining the bonded honeycomb segments 111 to a circular cross section in perpendicular to the flow paths 13, covering the machined outer surface with a coating material to form the peripheral wall 11. The outer peripheral shape of the cross section is not restricted to circle, but may be oval, triangle, square, or any other desired shape.

The plugs 16a, 16b may be formed in the flow paths 13 of sintered or unsintered honeycomb segment green bodies, or bonded or unbonded honeycomb segments.

[2] Production Method of Ceramic Honeycomb Structure

An example of the production methods of the ceramic honeycomb structure according to the present invention will be explained below.

(a) Preparation of Honeycomb Segment

First, pluralities of honeycomb segments each comprising pluralities of longitudinally penetrating flow paths partitioned by porous cell walls, and plugs formed in the end portions of the flow paths alternately in a checkerboard pattern are prepared.

(b) Preparation of Bonding Material

Next, 100 parts by mass of silicon carbide particles as aggregate are mixed with a binder comprising 5-25 parts by mass in total of alumina source particles and magnesia source particles, and an organic binder to prepare a bonding material for the bonding material layer. An inorganic binder, a pore-forming material, etc. may be mixed, if necessary. The alumina source particles are particles of compounds comprising alumina, and the magnesia source particles are particles of compounds comprising magnesia, and further particles of compounds comprising both alumina and magnesia may be included. The silicon carbide particles are contained as aggregate, and aggregate particles are bonded via the bonding phase such that they have fine pores.

5-25 parts by mass in total of the alumina source particles and the magnesia source particles as the binder are contained in the binder. With such amount, the bonding phase can contain at least a cordierite phase and a spinel phase. When the amount is less than 5 parts by mass, the bonding phase bonding silicon carbide particles exhibits low bonding strength, so that the bonding material layer has low strength. On the other hand, the amount of more than 25 parts by mass results in low heat resistance. The lower limit of the sum of alumina source particles and magnesia source particles is preferably 6 parts by mass, and more preferably 7 parts by mass, per 100 parts by mass of silicon carbide particles. On the other hand, the upper limit is preferably 23 parts by mass, and more preferably 20 parts by mass.

Alumina source particles and magnesia source particles are blended preferably at a molar ratio M2 [=($Al_2O_3$)/($Al_2O_3$+MgO)] of 0.30-0.60. With such a blending ratio, the bonding layer can comprise at least a cordierite phase and a spinel phase. The molar ratio M2 is calculated from the mass ratio of the blended alumina source particles and magnesia source particles. Namely, the molar numbers of an alumina component ($Al_2O_3$) and a magnesia component (MgO) in alumina source particles and magnesia source particles are calculated, to determine the molar number of the alumina component ($Al_2O_3$) per the total molar number of the alumina component ($Al_2O_3$) and the magnesia component (MgO), which is expressed by the molar ratio M2 [=($Al_2O_3$)/($Al_2O_3$+MgO)].

For example, when aluminum hydroxide [$Al(OH)_3$] and magnesium hydroxide [$Mg(OH)_2$] are used as the alumina source and the magnesia source, respectively, the alumina component in aluminum hydroxide and the magnesia component in magnesium hydroxide are expressed by $$Al(OH)_3 = (1/2)Al_2O_3 + (3/2)H_2O, \text{ and}$$

$$Mg(OH)_2 = MgO + H_2O.$$

As a result, it is calculated that the alumina component is 0.5 mol in 1 mol of aluminum hydroxide, and that the magnesia component is 1 mol in 1 mol of magnesium hydroxide. The molar numbers of the alumina component and the magnesia component are calculated from this relation as described above, to determine the molar ratio M2. Also, when particles of a compound containing both alumina and magnesia (for example, spinel) are used, the molar numbers of the alumina component ($Al_2O_3$) and the magnesia component (MgO) in this compound are similarly calculated to determine the molar ratio M2.

With the molar ratio M2 of 0.30-0.60, the bonding phase contains at least a cordierite phase and a spinel phase, providing a bonding material layer in which the molar ratio M1 of the cordierite phase [=cordierite phase/(cordierite phase+spinel phase)] is 0.50-0.85. As a result, good heat conduction is achieved between the bonded honeycomb segments, alleviating stress concentration, and providing the bonding phase with sufficient strength. When the molar ratio M2 is less than 0.30, the bonding material layer suffers poor heat conduction, resulting in less alleviation of stress concentration and lower strength. On the other hand, the molar ratio M2 of more than 0.60 results in low heat resistance. The lower limit of the molar ratio M2 is preferably 0.40.

The average particle diameter of the alumina source particles is preferably 1-15 μm. The average particle diameter of the magnesia source particles is preferably 1-15 μm.

The alumina source particles are preferably alumina or aluminum hydroxide particles, and the magnesia source particles are preferably magnesium oxide, magnesium hydroxide or talc particles. Using alumina or aluminum hydroxide particles as the alumina source particles, and magnesium oxide, magnesium hydroxide or talc particles as the magnesia source particles, sintering can preferably be conducted at a lower sintering temperature than ever without needing a non-oxidizing atmosphere as described later. It is particularly preferable to use alumina particles and magnesium hydroxide particles as the alumina source particles and the magnesia source particles, respectively, for the binder. The binder may contain particles of compounds comprising alumina and/or magnesia such as spinel, mullite, forsterite, etc., in addition to these alumina source particles and magnesia source particles.

The silicon carbide particles have a ratio D90/D10 of a particle diameter D90 to a particle diameter D10, which is preferably 1 or more and less than 10. With the D90/D10 of less than 1, the aggregate in the bonding material layer has a broad particle size distribution, resulting in weak bonding between the aggregate, so that the bonding material layer has low strength. On the other hand, when the D90/D10 is 10 or more, the bonding material shrinks after the bonding material layer is dried, generating gaps in the bonding material layer and between the bonding material layer and the segments, and thus providing the bonding material layer with low strength. The median particle diameter D50 of the silicon carbide particles is preferably 5-60 µm.

The particle diameter D10, median particle diameter D50 and particle diameter D90 of the silicon carbide particles can be measured, for example, by a microtrack particle diameter distribution meter MT3000 available from Nikkiso Co., Ltd. In a curve showing the relation between a measured particle diameter and a cumulative particle volume (obtained by accumulating the volume of particles having diameters equal to or smaller than a particular particle diameter), a particle diameter at a cumulative particle volume corresponding to 10% of the total particle volume is D10 (µm), a particle diameter at a cumulative particle volume corresponding to 50% of the total particle volume is a median particle diameter D50 (µm), and a particle diameter at a cumulative particle volume corresponding to 90% of the total particle volume is D90 (µm).

The organic binder may be methyl cellulose, ethyl cellulose, ethyl methyl cellulose, carboxymethyl cellulose, hydroxypropylmethyl cellulose, hydroxyethyl cellulose, hydroxymethyl cellulose, hydroxyethyl ethyl cellulose, etc. Among them, hydroxypropylmethyl cellulose and/or methyl cellulose are preferable. The organic binder is preferably 5-15% by mass per 100% by mass of the bonding material.

The inorganic binder may be colloidal silica, colloidal alumina, etc. The inorganic binder may be 40% or less by mass per 100% by mass of the bonding material.

The pore-forming material may be foamable resins, foamed resins, carbon, water-absorbing resins, fly ash balloons, etc. Among them, foamable resins and foamed resins with small particle diameter variation are preferable. The pore-forming material may be 20% or less by mass per 100% by mass of the bonding material. To exhibit sufficient effects, the pore-forming material is preferably 2% or more by mass.

(c) Preparation of Bonding Material Slurry

The mixed bonding material is blended with water to form a slurry. The water content is preferably 20-50% by mass to the bonding material.

(d) Production of Ceramic Honeycomb Structure

With the formed slurry applied to the peripheral walls of the honeycomb segments, the honeycomb segments are placed such that their peripheral walls are facing each other, and adjacent honeycomb segments are pressed to each other for bonding. A bonded honeycomb segment assembly thus formed is dried, machined in end surfaces, an outer peripheral surface, etc., if necessary, and then sintered in a temperature range of 1100-1350° C. in an oxidizing atmosphere to produce an integral ceramic honeycomb structure.

Though not particularly restrictive, the drying method may be hot-air drying, microwave drying, high-frequency heating, etc.

The sintering is conducted in a temperature range of 1100-1350° C. By sintering in such a temperature range, alumina particles and magnesium hydroxide particles are sintered, forming a bonding phase in which silicon carbide particles are bonded. As a result, the sintering for forming the bonding phase can be conducted at a lower cost than ever. At lower than 1100° C., the silicon carbide particles and the bonding phase are insufficiently bonded, failing to provide the bonding material layer with sufficient strength.

On the other hand, sintering at higher than 1350° C. results in low heat shock resistance. Because the sintering temperature can be lowered in the method of the present invention, sintering can be conducted in an oxidizing atmosphere without needing a non-oxidizing atmosphere for suppressing oxidation as in conventional technologies, thereby suppressing cost increase in the sintering step. The lower limit of the temperature is preferably 1150° C., more preferably 1200° C., further preferably 1250° C., and most preferably 1300° C.

Peripheral portions of the bonded ceramic honeycomb structures are machined to a desired shape such as a cylindrical shape, and coated with a coating material, which is dried to form a peripheral wall. The coating material may be at least one selected from silica, colloidal silica, silicon carbide particles, etc., which are mixed with an organic binder, water, etc. The drying conditions are, for example, 80-150° C. and 0.5-2.0 hours.

The present invention will be explained in further detail referring to Examples below, without limiting the present invention to them.

Examples 1 and 2

(a) Production of Honeycomb Segments

Silicon carbide powder and silicon powder as honeycomb segment materials were mixed with methyl cellulose as an organic binder, and blended with water to form a plastically moldable material. This moldable material was extrusion-molded, dried by microwave, degreased at 350° C. in the air, and then sintered at 1450° C. in an Ar atmosphere to obtain a honeycomb segment having a cell wall thickness of 200 µm, a cell density of 46.5 cells/cm$^2$ (300 cells per square inch), a square cross section of 34 mm in each side, and a length of 304 mm. Plugs were formed in the end portions of flow paths of the honeycomb segment alternately in a checkerboard pattern by introducing a plugging material into them.

(b) Preparation of Bonding Material Slurry

To form a bonding material, silicon carbide particles and binder particles (alumina source particles and magnesia source particles), whose particle sizes are shown in Table 1, a hydroxypropylmethyl cellulose as an organic binder, a foamed resin as a pore-forming material, and colloidal silica as an inorganic binder were mixed in the amounts shown in Table 1. The resultant bonding material was blended with water to prepare a slurry.

TABLE 1-1

| | Silicon Carbide Particles | | |
|---|---|---|---|
| No. | Amount (parts by mass) | D50 (µm) | D90/D10 |
| Example 1 | 90 | 10 | 9.2 |
| Example 2 | 90 | 40 | 3.6 |
| Com. Ex. 1 | 100 | 33 | 9.2 |

TABLE 1-2

| | Binder | | | | | |
|---|---|---|---|---|---|---|
| | Total Amount | Alumina Source Particles | | Magnesia Source Particles | | Molar |
| No. | (parts by mass) | Type | D50 (µm) | Type | D50 (µm) | Ratio M2[(1)] |
| Example 1 | 10 | Alumina | 5 | Magnesium Hydroxide | 11 | 0.45 |

TABLE 1-2-continued

| | | Binder | | | |
|---|---|---|---|---|---|
| | Total Amount | Alumina Source Particles | | Magnesia Source Particles | | Molar |
| No. | (parts by mass) | Type | D50 (μm) | Type | D50 (μm) | Ratio M2[(1)] |
| Example 2 | 10 | Alumina | 5 | Magnesium Hydroxide | 11 | 0.40 |
| Com. Ex. 1 | — | — | — | — | — | — |

Note
[(1)]Molar ratio M2 = (Al$_2$O$_3$)/(Al$_2$O$_3$ + MgO)].

TABLE 1-3

| No. | Pore-Forming Material (parts by mass) | Colloidal Silica (parts by mass) |
|---|---|---|
| Example 1 | 4.0 | 8.5 |
| Example 2 | 4.0 | 8.5 |
| Example 3 | 4.0 | 40 |

(c) Production of Ceramic Honeycomb Structure

The slurry was applied to the peripheral wall of each honeycomb segment, and the honeycomb segments were assembled with their adjacent peripheral walls facing each other. Adjacent honeycomb segments were bonded to each other under pressure to obtain a bonded honeycomb segment assembly, in which two honeycomb segments 111, 111 were integrally bonded via a bonding material layer 19. This bonded honeycomb segment assembly was dried at 110° C. for 2 hours, and then sintered at 1300° C. in an oxidizing atmosphere to obtain each ceramic honeycomb structure 110 of Examples 1 and 2.

In Table 1, the molar ratios M2 of other particles than silicon carbide particles were the molar number ratios of (Al$_2$O$_3$)/(Al$_2$O$_3$+MgO) calculated from alumina (Al$_2$O$_3$) and magnesium hydroxide [Mg(OH)$_2$] used. In Table 2, the molar ratio M1 of cordierite in each bonding material layer was calculated from the molar numbers of the cordierite phase and the spinel phase measured by X-ray diffraction, using the formula of cordierite (mol)/[cordierite (mol)+ spinel (mol)]. The content of (cordierite phase+spinel phase) in each bonding phase was calculated as a total mass ratio of the cordierite phase and the spinel phase per a total mass ratio of crystal phases.

Comparative Example 1

Honeycomb segments were produced in the same manner as in Example 1, and plugs were similarly formed. To form a bonding material, silicon carbide particles having the particle size shown in Table 1, hydroxypropylmethyl cellulose as an organic binder, and colloidal silica as an inorganic binder were mixed in the amounts (per 100 parts by mass of silicon carbide particles) shown in Table 1. The resultant bonding material was blended with water to prepare a slurry.

The slurry was applied to the peripheral walls of the honeycomb segments, and the honeycomb segments were assembled with their adjacent peripheral walls facing each other. Adjacent honeycomb segments were bonded to each other under pressure to form a bonded honeycomb segment assembly, in which two honeycomb segments 111, 111 were integrally bonded via a bonding material layer 19. This bonded honeycomb segment assembly was dried at 110° C. for 2 hours, and then sintered at 1300° C. in an oxidizing atmosphere to obtain the ceramic honeycomb structure 110 of Comparative Example 1.

The ceramic honeycomb structures 110 of Examples 1 and 2 and Comparative Example 1 were measured with respect to the porosity of the bonding material layer, thermal conductivity and bending strength, by the following methods. The results are shown in Table 2.

(a) Measurement of Porosity

The porosity was measured by mercury porosimetry. A test piece (10 mm×10 mm×10 mm) cut out of each ceramic honeycomb structure 110 was set in a measurement cell of Autopore III available from Micromeritics, and the cell was evacuated. Thereafter, mercury was introduced into the cell under pressure to determine the relation between the volume of mercury pressed into pores in the test piece and the pressure. The above pressure was converted to a pore diameter, and the volumes of pores was accumulated from smaller pore diameters to larger pore diameters to obtain a cumulative pore volume (corresponding to the volume of mercury), which was plotted against the pore diameter, thereby obtaining a graph showing the relation between pore diameter and cumulative pore volume. The mercury-intruding pressure was 0.5 psi (0.35×10$^{-3}$ kg/mm$^2$), and constants used for calculating the pore diameter from the pressure were a contact angle of 130°, and a surface tension of 484 dyne/cm. A cumulative pore volume at which the pressure of mercury was 1800 psi (1.26 kg/mm$^2$, corresponding to a pore diameter of about 0.1 μm) was regarded as the total pore volume. The porosity was calculated from the total pore volume, assuming that silicon carbide has a true density of 3.2 g/cm$^3$.

(b) Measurement of Thermal Conductivity

A test piece having a shape of 10 mm×10 mm×0.6-2.5 mm was obtained from each ceramic honeycomb structure 110, and measured with respect to thermal diffusivity by a laser-flash thermal diffusivity meter (LFA467HT available from Netzsch Japan), and the thermal conductivity was calculated from the thermal diffusivity, the specific heat capacity, and the density of the test piece.

(c) Bending Strength Ratio

Figure 4:
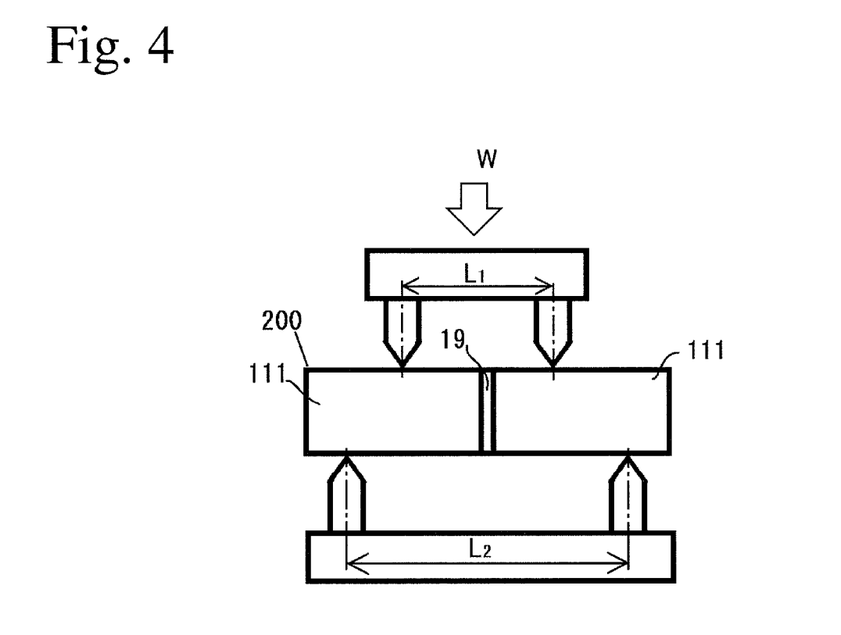
FIG. 4 is a schematic view showing a four-point bending test machine used in Examples.

A test piece 200 as long as 20 mm in a flow path direction was cut out of the ceramic honeycomb structure 110 in a direction perpendicular to the flow paths from the end surface, and set in a four-point bending test machine shown in FIG. 4, such that a bending stress was applied to the bonding material layer 19. The bending strength of the test piece was measured by applying a load W in the flow path direction under the conditions that the distance L1 between two loading points was 20 mm, and that the distance L2 between two fulcrums was 60 mm. The bending strength ratio is expressed by a relative value, assuming that the bending strength of Comparative Example 1 is 1.00.

TABLE 2

| No. | Bonding Phase in Bonding Material Layer | | | Bonding Material Layer | | |
|---|---|---|---|---|---|---|
| | Molar Ratio M1 of Cordierite[1] | Molar Ratio of Spinel[2] | Content[4] (% by mass) | Porosity (%) | Thermal Conductivity (W/m·K) | Bending Strength Ratio[3] |
| Example 1 | 0.76 | 0.24 | 50.1 | 62.0 | 1.28 | 1.24 |
| Example 2 | 0.75 | 0.25 | 81.6 | 64.0 | 0.98 | 1.19 |
| Com. Ex. 1 | — | — | — | 65.0 | 0.26 | 1.00 |

Note
[1]The molar ratio M1 of cordierite = cordierite (mol)/[cordierite (mol) + spinel (mol)].
[2]The molar ratio of spinel = spinel (mol)/[cordierite (mol) + spinel (mol)].
[3]Relative value assuming that the bending strength of Comparative Example 1 is 1.00.
[4]The percentage of cordierite phase + spinel phase in the bonding phase.

It is clear from Table 2 that the ceramic honeycomb structures of Examples 1 and 2 according to the present invention had higher thermal conductivity, and as high bending strength as about 1.2 times, as compared with the ceramic honeycomb structure of Comparative Example 1.

What is claimed is:

1. A ceramic honeycomb structure comprising pluralities of honeycomb segments each having pluralities of longitudinally penetrating flow paths partitioned by porous cell walls and plugs formed in the end portions of said flow paths, and a bonding material layer boding the peripheral walls of said honeycomb segments,
    said bonding material layer comprising silicon carbide particles as aggregate, and a bonding phase bonding said silicon carbide particles,
    said bonding phase comprising at least a cordierite phase and a spinel phase,
    the molar ratio M1 of said cordierite phase [=cordierite phase/(cordierite phase+spinel phase)] being 0.50 or more and less than 1.0, and
    the content of (cordierite phase+spinel phase) in said bonding phase being 50% or more by mass.

2. The ceramic honeycomb structure according to claim 1, wherein said bonding phase further comprises at least one selected from the group consisting of cristobalite, mullite and forsterite.

3. The ceramic honeycomb structure according to claim 1, wherein the thermal conductivity of said bonding material layer is 0.1-4.0 W/m·K.

4. The ceramic honeycomb structure according to claim 1, wherein the porosity of said bonding material layer is 50-70%.

5. A method for producing the ceramic honeycomb structure according to claim 1, comprising
    mixing 100 parts by mass of silicon carbide particles with a binder comprising 5-25 parts by mass in total of alumina source particles and magnesia source particles, and an organic binder,
    blending the resultant mixture with water to obtain a slurry,
    applying said slurry to the peripheral walls of said honeycomb segments,
    bonding the peripheral walls of said honeycomb segments to each other,
    drying the bonded honeycomb segments, and
    sintering the bonded honeycomb segments in a range of 1100-1350° C. in the air.

6. The method for producing a ceramic honeycomb structure according to claim 5, wherein said binder further comprises an inorganic binder.

7. The method for producing a ceramic honeycomb structure according to claim 6, wherein said inorganic binder is colloidal silica and/or colloidal alumina.

8. The method for producing a ceramic honeycomb structure according to claim 5, wherein said binder further comprises a pore-forming material.

9. The method for producing a ceramic honeycomb structure according to claim 5, wherein said binder further comprises at least one selected from the group consisting of spinel particles, mullite particles and forsterite particles.

10. The method for producing a ceramic honeycomb structure according to claim 5, wherein said alumina source particles and said magnesia source particles are mixed at a molar ratio M2 [=(Al$_2$O$_3$)/(Al$_2$O$_3$+MgO)] of 0.30-0.60.

11. The method for producing a ceramic honeycomb structure according to claim 5, wherein in said binder, the alumina source particles are alumina particles or aluminum hydroxide particles, and the magnesia source particles are magnesium oxide particles or magnesium hydroxide particles.

12. The method for producing a ceramic honeycomb structure according to claim 5, wherein said silicon carbide particles have a ratio D90/D10 of 1 or more and less than 10, wherein D10 represents a particle diameter at a cumulative particle volume corresponding to 10% of the total particle volume, and D90 represents a particle diameter at a cumulative particle volume corresponding to 90% of the total particle volume, in a curve showing the relation between particle diameter and cumulative particle volume.

* * * * *